Feb. 13, 1951     E. A. DAVIS     2,541,214

ELECTRICAL BRANDING TOOL

Filed Sept. 11, 1948

Inventor
Edward A. Davis
By Dwight L. Moody
Atty

Patented Feb. 13, 1951

2,541,214

UNITED STATES PATENT OFFICE 2,541,214

ELECTRICAL BRANDING TOOL

Edward A. Davis, Akron, Ohio, assignor to The B. F. Goodrich Company, New York, N. Y., a corporation of New York Application September 11, 1948, Serial No. 48,867

3 Claims. (Cl. 219—30)

The invention relates to tools for marking bodies by a heating action, and especially to electrical branding tools useful for marking articles of manufacture capable of being branded by heat, especially rubber products including pneumatic tires.

Heretofore, paints, inks and other marking materials have been employed for marking tire casings and other rubber products during their manufacture and inspection as for identification purposes. These marks or symbols often become abraded, distorted and illegible or even wholly obliterated under subsequent use and handling, thereby defeating the intended purpose. Electrical heating tools such as commercial soldering irons wherein the heat is conducted to the tip end of the heating rod from a resistance heating source remote with respect to the tip, have also been found unsatisfactory for rubber marking purposes; since adequate temperatures for this purpose are not obtainable at the tip end of the iron due to the indirect heating, conduction, radiation and other heat losses.

An object of the invention is to overcome the foregoing and other difficulties and disadvantages of the prior marking expedients and devices.

Other objects of the invention are to provide an improved electrical branding tool adapted especially for marking articles of rubber and other materials; to provide for maintaining temperatures at the marking face effective for branding purposes; to provide for minimizing heat losses; to provide for electrical resistance-heating action of the marking or heating member of the tool; to provide for separably attaching and supporting the heating member at an end of the tool; and to provide for simplicity and durability of construction, convenience of manufacture and servicing, and for effectiveness of operation.

These and other objects and advantages of the invention will be apparent from the following description.

Figure 1:
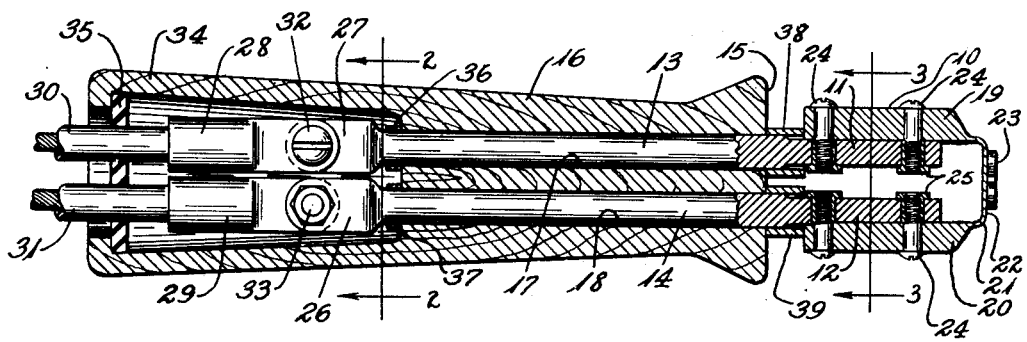

In the accompanying drawings which form a part of this specification and in which like numerals are employed to designate like parts throughout the same, Fig. 1 is a longitudinal sectional view of an electrical branding tool constructed in accordance with and embodying the invention.

Figure 2:
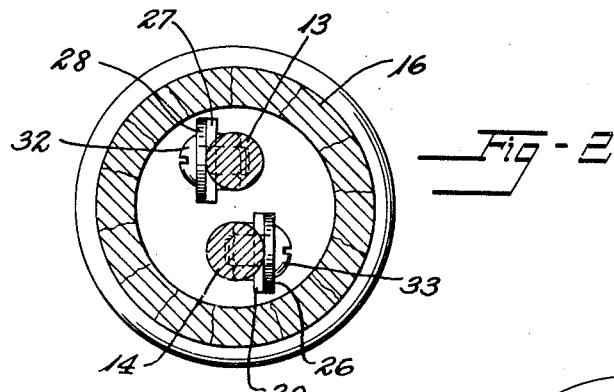
Figure 4:
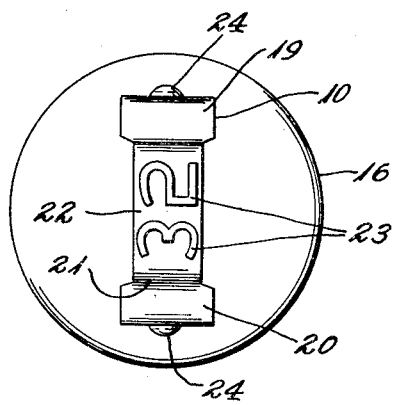
Figure 3:
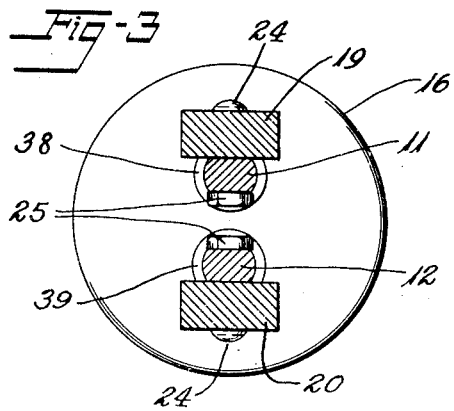

Fig. 2 is a transverse sectional view of the tool taken along line 2—2 of Fig. 1, Fig. 3 is a view like Fig. 2 but taken along line 3—3 of Fig. 1, and Fig. 4 is a view showing tool as viewed from the marking end thereof.

The illustrative embodiment of the invention shown in the drawings includes in its construction a heating member 10 desirably of generally U-shaped form separably attached to mounting portions 11, 12 of support elements 13, 14 projecting axially beyond an end face 15 of an elongated hollow handle 16, which support elements may be disposed in transversely spaced-apart bores 17, 18 extending longitudinally or axially of the handle.

The heating member 10 is made of electrical resistance stiff material, preferably metal material such, for example, as a suitable nickel-chromium alloy which may contain 80% nickel, 15% chromium and 5% iron, and which may have a specific resistivity at 20° centigrade of 675 ohms per circular mil-foot. For the arrangement shown, this particular nickel-chromium alloy makes possible the provision of temperatures within the range of about 650° to about 750° Fahrenheit, which temperatures have been found effective for the intended purposes, especially for the branding of pneumatic tire casings of natural or synthetic rubber or other rubber-like material. However, other nickel-chromium alloys and other electrical resistance stiff, hard materials of different compositions, proportions and specific resistivity characteristics may be utilized to provide the desired branding temperatures for the particular intended usage of the tool.

Desirably, the U-shaped heating member 10 is formed of strip material and comprises a pair of transversely spaced-apart terminal portions 19, 20 opposite one another and extending axially of the tool with their free ends adjacent the end face 15, which portions constitute the substantially parallel legs of the U-shape. An intermediate portion 21 consituting the base of the U-shape, extends directly between and interconnects the terminal portions at their other ends so that the outer face 22 provides a substantially flat surface in a transverse plane perpendicular to the terminal portions and the longitudinal axis of the tool.

As shown especially in Figs. 1 and 4, the intermediate portion 21 is desirably of reduced width and thickness as compared to that of the terminal portions 19, 20, i. e., reduced cross-sectional area facilitating the generation of high temperatures and the concentration of heat at the intermediate portion together with relatively low temperatures at the terminal portions upon the passage of electrical heating current to and through the heating member 10. The intermediate portion is so dimensioned as to resist objectionable distortion even under red heat conditions with temperatures exceeding those given hereinabove.

At the outer face 22, there is provided a mark formation 23 which may be one or more numbers, letters, medallion, seal, brand, label or other suitable figure, character, symbol or mark. In the arrangement shown, the two numbers, 3 and 2, employed for illustrative purposes only, are upraised with respect to the outer face 22, although, if desired, the mark formation may be countersunk as by stamping or engraving into the surface of the outer face. Preferably, the mark formation is integral with and in continuation of the material of the intermediate portion for facilitating electrical heat-generation and conduction, i. e., direct resistance heating action of all parts of the mark formation.

The relatively thick and wide terminal portions 19, 20 may each have spaced-apart apertures through which extend screw fasteners 24, 24 engaging the threads of internally-threaded, tubular, headed nuts 25, 25 snugly fitting in corresponding spaced-apart apertures in the mounting portions 11, 12, which fasteners and nuts may be of steel or other suitable current-conducting metal. The contacting surfaces of the terminal portions and the mounting portions are each desirably flat, as shown especially in Figs. 1 and 3, to assure good electrical contact thereof over a substantial area and to facilitate the secure attachment of the heating member 10 to the tool.

The support elements 13, 14 are desirably of electrically conductive stiff material which may be in the form of solid, round rods of copper, beryllium bronze or other conductive metal. The support elements are of dimensions such that the mounting portions 11, 12 projecting beyond the end face 15 constitute support means affording sufficient support to the heating member 10 to retain the same in position under all conditions of use. The support elements are also of such size that they will conduct the electrical heating current without objectionable resistance and heating.

The support elements being disposed in the bores 17, 18, are maintained by the handle 16 in side-by-side electrically insulated relation to one another, the handle being made desirably of wood, hard rubber, molded plastic or other suitable non-metallic, non-conductive material for this purpose. The support elements at their other ends opposite the mounting portions terminate in connector fittings 26, 27 separably attached to socket fittings 28, 29 of electrical conductor cords 30, 31. The connector fittings 26, 27 may be flat end portions of the support elements with apertures for receiving bolt and nut fasteners 32, 33. In the engaged condition, the connector fittings 26, 27 and the socket fittings 28, 29 are positioned in a hollow end portion 34 of the handle 16, which hollow portion 34 may be separably closed at its open end as by a flexible closure disk 35 of rubber material having spaced-apart apertures for receiving the conductor cords 30, 31.

For retaining the support elements and the heating member in the desired relative position with respect to the handle, tubular spacers 36, 37 of steel may be soldered or brazed to the support elements adjacent the connector fittings 26, 27 and tubular spacers 38, 39 of steel may be disposed upon and in unattached relation to the support elements between the free ends of the heating member 10 and the end face 15 of the handle, as shown especially in Fig. 1, which spacers 38, 39, in addition to their positioning function, also transmit thrust from the heating member directly to the handle while relieving the support elements 13, 14 and their screw connections 24, 24 of such thrust.

The handle 16 may be of suitable shape to fit the hand of the operator substantially as shown in the drawings.

In the operation of the electrical branding tool as for branding rubber tires being inspected after vulcanization, the tool is connected to a source of electrical heating current whereupon the current flows to and through the support elements and the heating member. The support elements 13, 14 offer minimum resistance to the flow of the current. The terminal portions 19, 20 also offer minimum resistance to the flow of the current and do not generate heat directly to any substantial extent. The intermediate portion 21 including the mark formation 23 offers maximum resistance to the flow of the current, whereby high temperatures within the aforesaid range are generated directly and continuously at the portion 21. This makes possible a most efficient use of the heating current and the provision of temperatures effective for the branding of the tires upon application of the heating member to the body of the tire. Substantially all of the heat produced by the heating member is thus utilized and applied directly for branding the article with minimum losses of heat by conduction and radiation at other parts of the tool including the terminal portions 19, 20. Due to the high temperatures produced and maintained by the heating member, branding is accomplished in a short interval of time and the branded mark remains clearly distinguishable even after extended subsequent usage and manipulation of the tire.

The construction of the tool also facilitates its use with little or no danger to the operator from burns and electrical shock hazards. Servicing of the tool and replacement of the heating member are also conveniently effected.

Variations may be made without departing from the scope of the invention as it is defined in the following claims.

I claim:

1. An electrical branding tool comprising a tubular handle, a pair of adjacent support elements of electrically conductive material in spaced-apart side-by-side relation in said handle and projecting from an end thereof to provide elongated mounting portions terminating at a position adjacent and spaced-apart from said end, registering means in said handle integral with said support elements at a position remote from said end for contacting an inner wall of the handle, a branding member of electrically resistant material in generally U-shape embracing said mounting portions, the base portion of said member extending between the free ends of said mounting portions and being substantially flat and relatively thin as compared to its width to provide a resistance heating portion and bearing branding indicia integral therewith, the leg portions of said member being relatively thick as compared to said base portion to provide attaching portions of substantially increased conductivity in overlapping contacting relation to said mounting portions lengthwise of the same and terminating short of said end of the handle, fastener means separably securing said branding member to said mounting portions, and thrust-transmitting elements on said mounting portions between said end of the handle and the adjacent ends of said leg portions for transmitting thrust from said branding member directly to said handle while relieving said support elements of such thrust.

2. An electrical branding tool comprising a branding member of electrically resistant material in generally U-shape the base portion of which is relatively thin as compared to its width to provide a resistance heating portion and has branding indicia integral therewith, the leg portions of said member projecting from said base portion in spaced-apart relation and being relatively thick and wide as compared to said base portion for relatively greater conductivity, conductors mounted on said leg portions in overlapping contacting relation therewith lengthwise thereof and projecting lengthwise therefrom, a tubular handle mounted on said conductors in telescopic slidable relation therewith and having an end disposed adjacent and spaced from said leg portions, and a pair of spaced-apart thrust-transmitting tubular elements on said conductors between said end of the handle and the adjacent ends of said leg portions for transmitting thrust directly between said branding member and said handle while relieving said conductors of such thrust.

3. An electrical branding tool comprising a branding member comprising a one-piece body of electrically resistant material in generally U-shape, the base portion of said body being substantially flat and relatively thin as compared to its width to provide a resistance heating portion and having branding indicia integral therewith, the leg portions of said body projecting from said base portion in spaced-apart relation and being relatively thick and wide as compared to said base portion for relatively greater conductivity and presenting end faces of substantial area, conductors of stiff rod material detachably mounted on said leg portions in overlapping contacting relation therewith lengthwise thereof and projecting lengthwise therefrom, a tubular handle mounted on said conductors in telescopic slidable relation therewith and having an end disposed adjacent and spaced from said end faces of the leg portions, and a pair of spaced-apart thrust-transmitting tubular elements on said conductors between and bearing directly against said end of the handle and said end faces of the leg portions for transmitting thrust directly between said branding member and said handle while relieving said conductors of such thrust.

EDWARD A. DAVIS.

REFERENCES CITED

The following references are of record in the file of this patent:

UNITED STATES PATENTS

| Number | Name | Date |
|---|---|---|
| 483,050 | Fitzmaurice | Sept. 20, 1892 |
| 712,989 | Washburn | Nov. 4, 1902 |
| 1,413,053 | Onstad | Apr. 18, 1922 |
| 1,503,890 | Flesch | Aug. 5, 1924 |
| 1,792,688 | Graff | Feb. 17, 1931 |
| 1,834,555 | Tittle | Dec. 1, 1931 |
| 1,905,364 | Brindley | Apr. 25, 1933 |
| 2,081,894 | Meyer et al. | May 25, 1937 |
| 2,213,898 | Brook | Sept. 3, 1940 |
| 2,310,844 | Draeger | Feb. 9, 1943 |
| 2,359,393 | Sloan | Oct. 3, 1944 |

FOREIGN PATENTS

| Number | Country | Date |
|---|---|---|
| 787,065 | France | Sept. 16, 1935 |